Feb. 14, 1956 J. O. BERNDTSON 2,734,401
REVERSE GEARS
Filed June 9, 1950 7 Sheets-Sheet 1
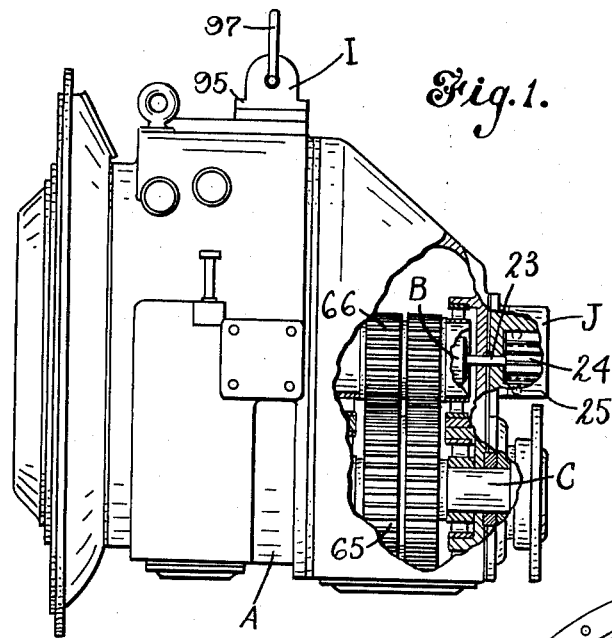
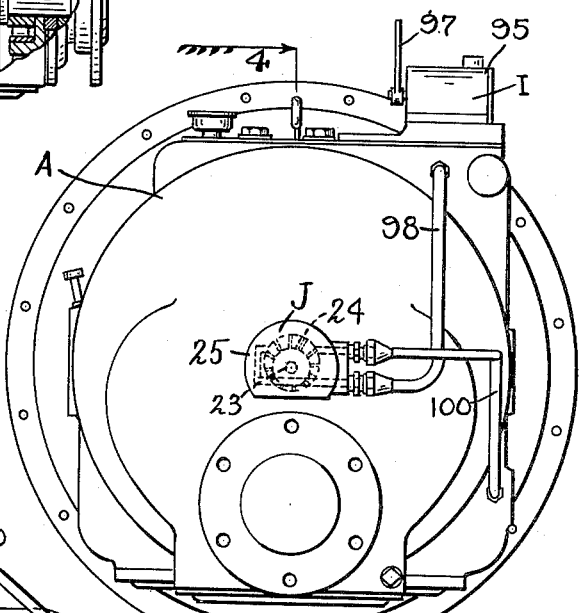
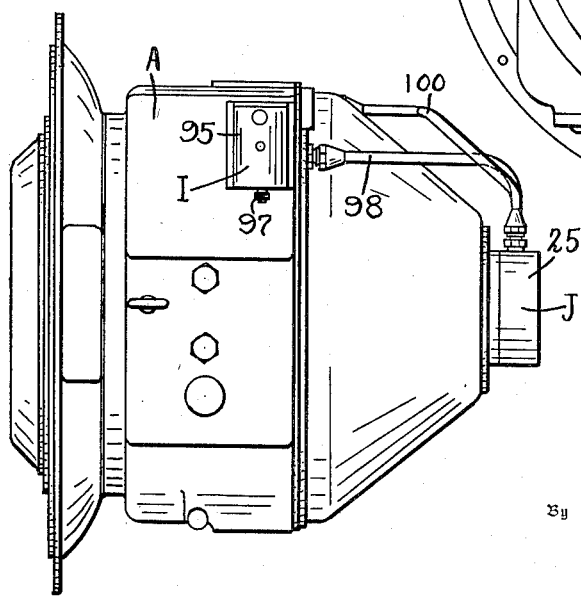
Inventor
John O. Berndtson
By Rockwell & Bartholow
Attorneys Inventor
John O. Berndtson
By Rockwell & Bartholow
Attorneys Feb. 14, 1956   J. O. BERNDTSON   2,734,401
REVERSE GEARS
Filed June 9, 1950   7 Sheets-Sheet 3
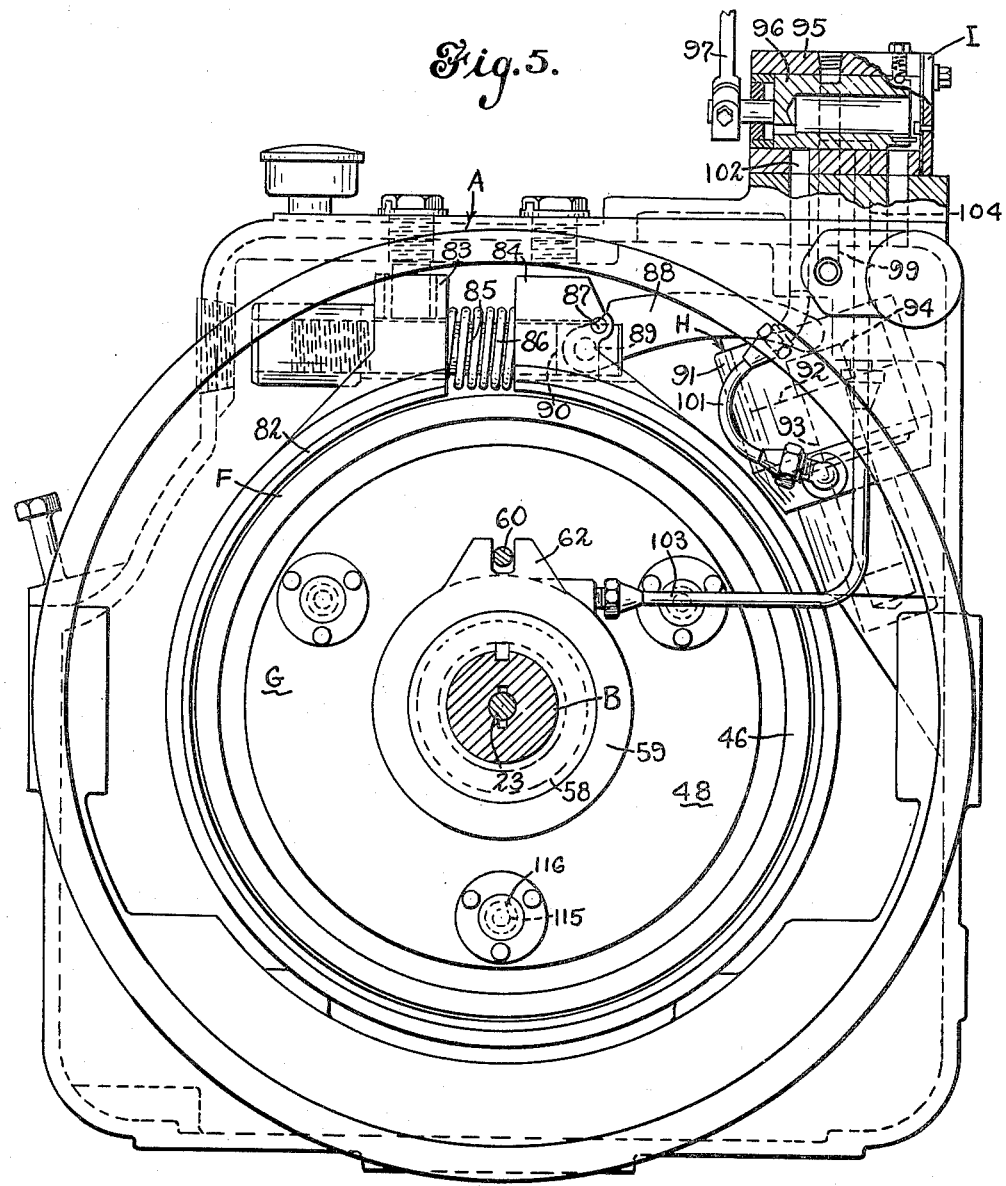
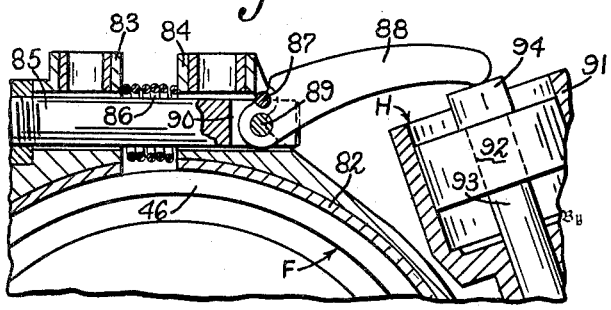
Inventor
John O. Berndtson
Rockwell & Bartholow
Attorneys

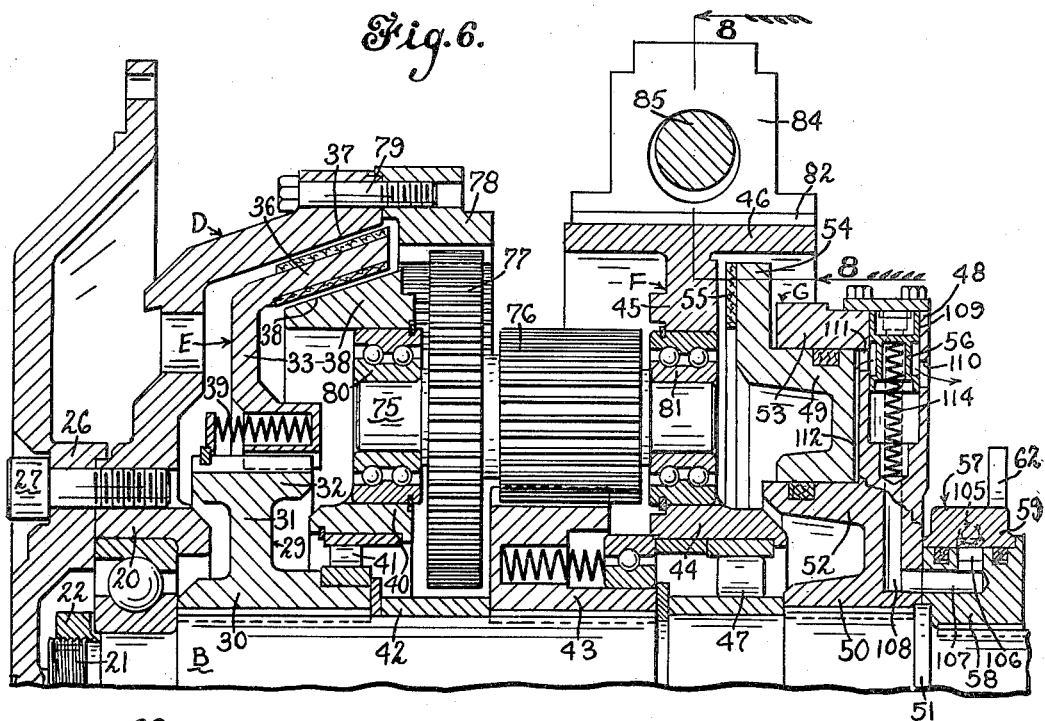
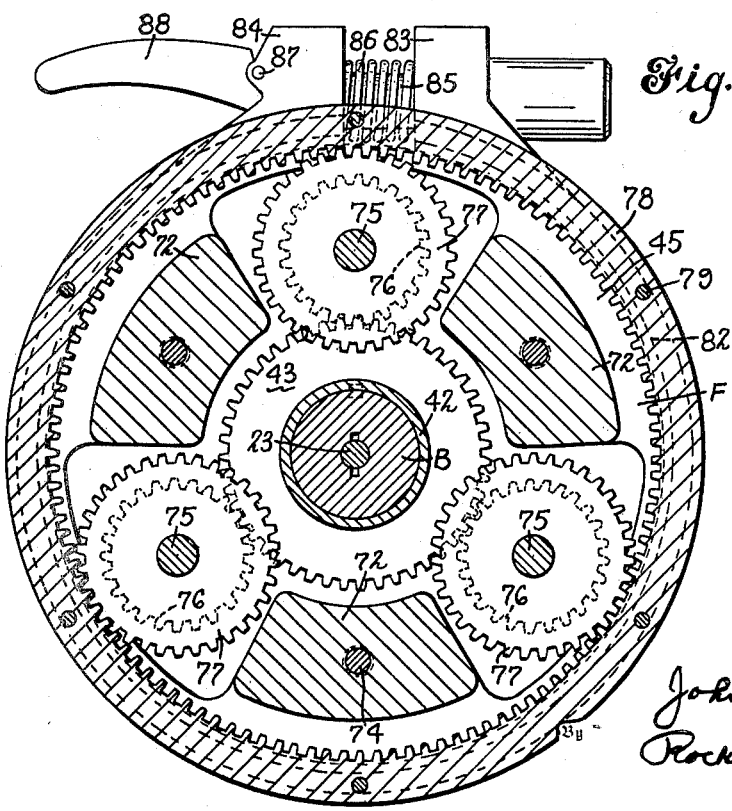

Feb. 14, 1956 J. O. BERNDTSON 2,734,401
REVERSE GEARS
Filed June 9, 1950 7 Sheets-Sheet 7
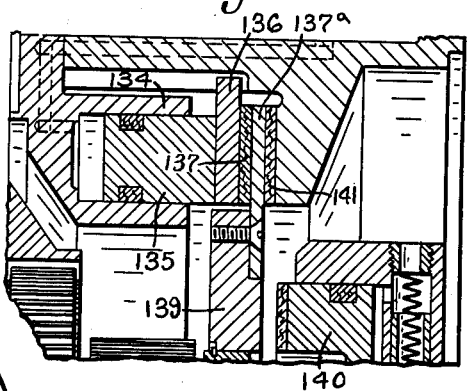
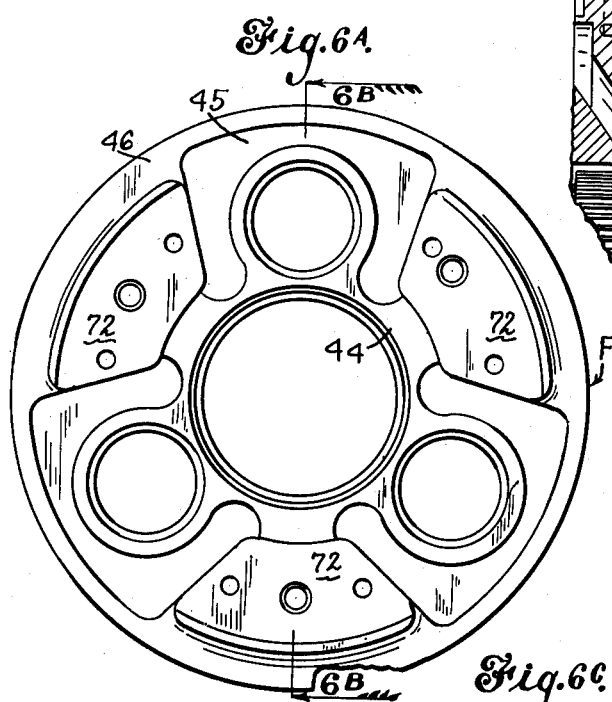
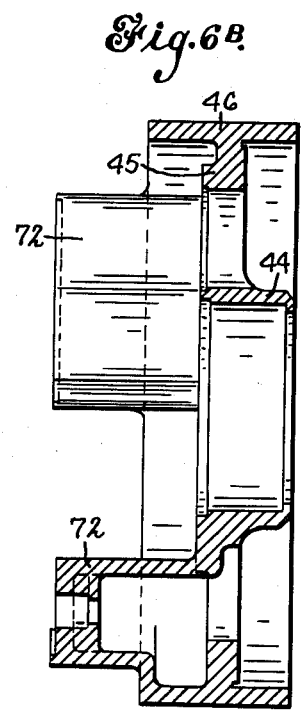
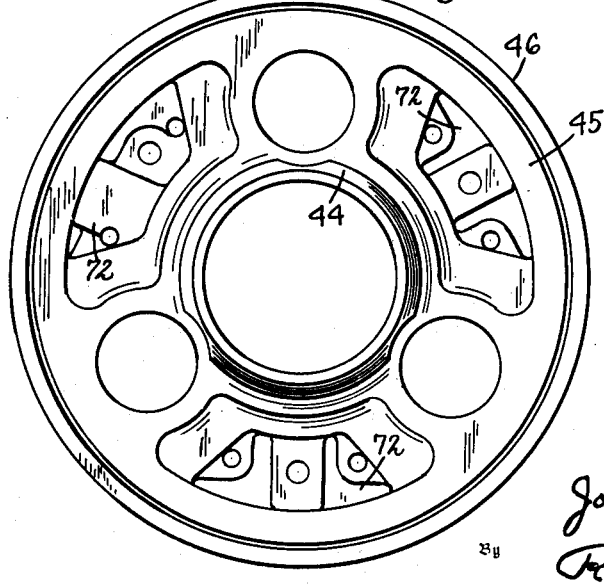
Inventor
John O. Berndtson
By Rockwell & Bartholow
Attorneys United States Patent Office 2,734,401
Patented Feb. 14, 1956

2,734,401

REVERSE GEARS

John O. Berndtson, Hotchkiss Grove, Conn., assignor to The Snow-Nabstedt Gear Corporation, New Haven, Conn., a corporation of Connecticut Application June 9, 1950, Serial No. 167,088

12 Claims. (Cl. 74—792)

This invention relates to reverse gears for marine use, and particularly to reverse gears of the general type disclosed in the Nabstedt Patent 2,286,223, of June 16, 1942, in which a relatively short central shaft or main shaft is employed having in association with the forward end thereof a friction clutch for clutching a power-driven member to the shaft, there being provided rearwardly of the friction clutch a brakeable, rotatable gear set which, when its rotary motion is arrested by braking, produces reverse rotation of the shaft.

The present reverse gear, as distinguished from that just mentioned, usually has its manipulation controlled by power means, and more particularly by fluid-pressure means, the latter being operable to shift the gear from neutral position to forward drive or reverse drive, as may be desired.

One of the objects of the present invention is to provide an improved fluid-pressure controlled reverse gear of the general type above mentioned.

Another object is to provide an improved organization and arrangement of the principal parts of the gear.

Another purpose of the invention is to increase the compactness of the structure and decrease the length to a minimum.

Another purpose is to simplify the gearing used for reverse drive to a great extent and reduce the number of parts.

Another object is to provide an arrangement for reverse drive of the shaft which is very simple and is very easily and conveniently operable.

Another purpose of the invention is to provide improved means for engaging and disengaging the friction clutch of a reverse gear of the general type above mentioned.

In the accompanying drawings:

Fig. 1 is a side elevation of a reverse gear embodying the invention, certain parts being broken away;

Fig. 2 is a top plan view of the gear shown in Fig. 1;

Fig. 3 is an elevation looking toward the rear end of the gear;

Figure 4:
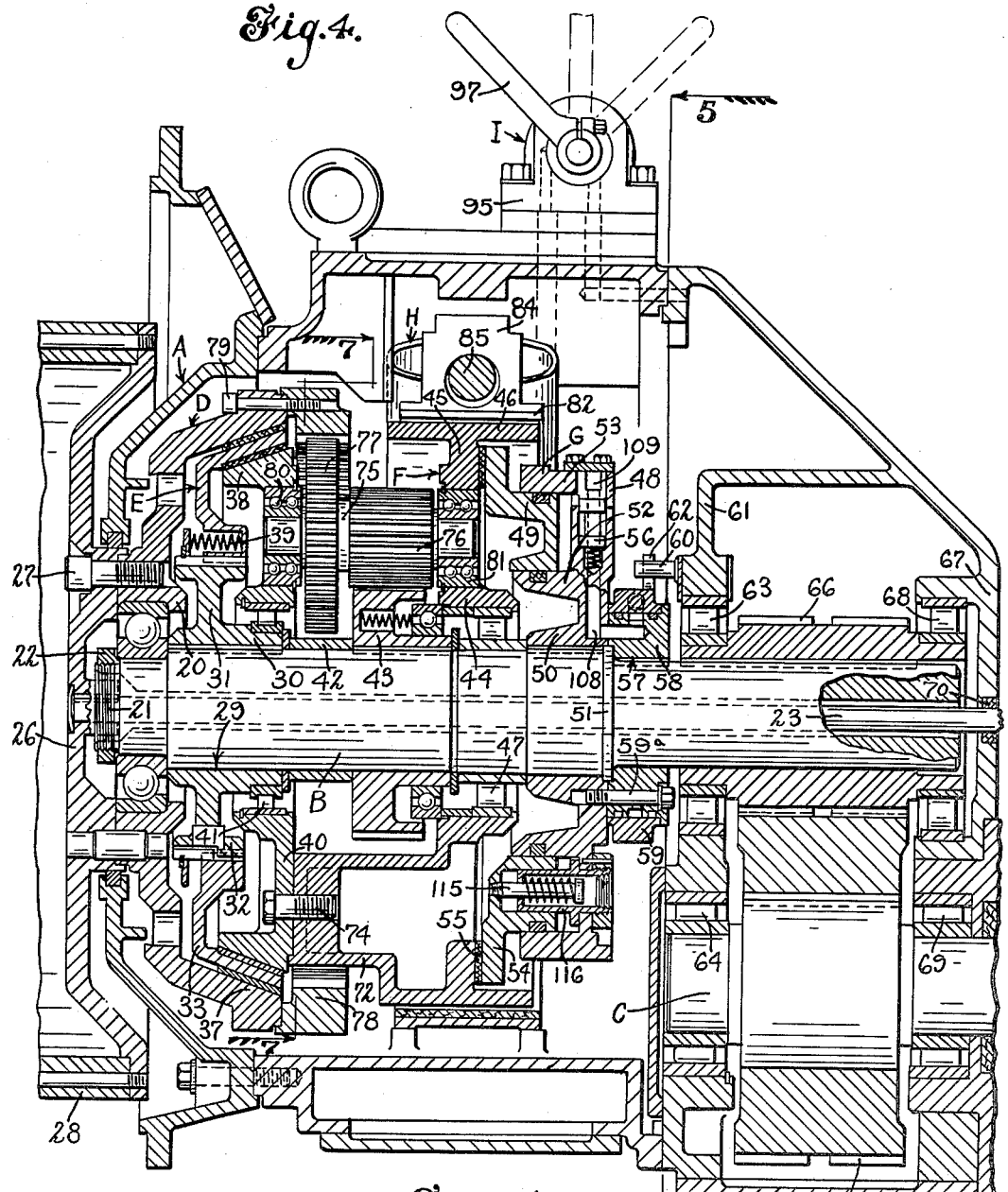
Fig. 4 is a vertical longitudinal section of the gear on a larger scale, a portion of the gear at the rear end thereof being omitted, and the parts being in position for forward drive.
Figure 9:
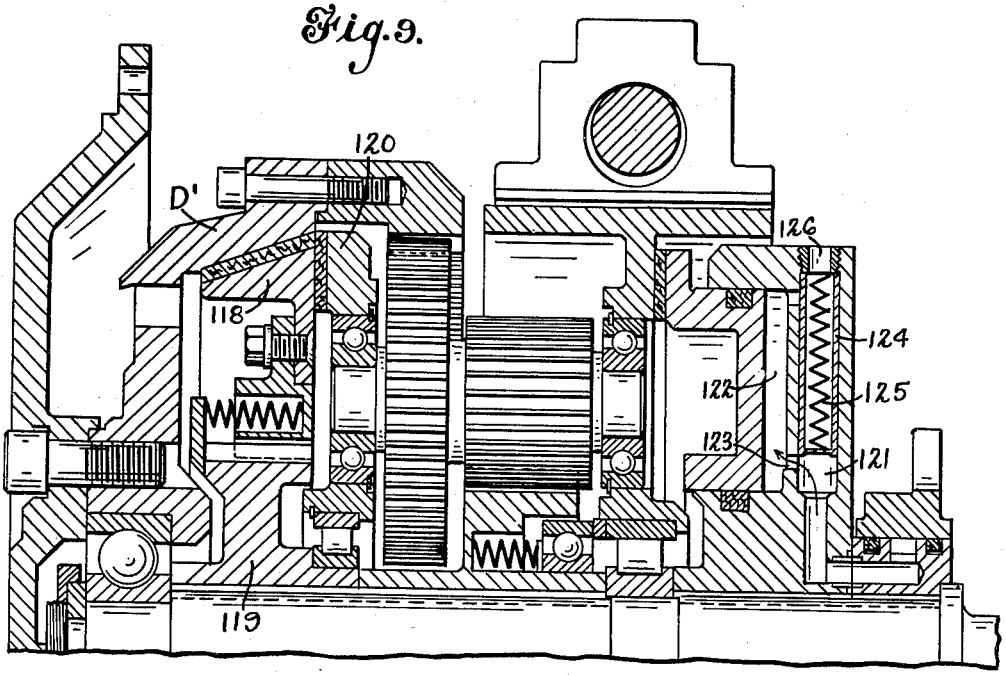
Figure 10:
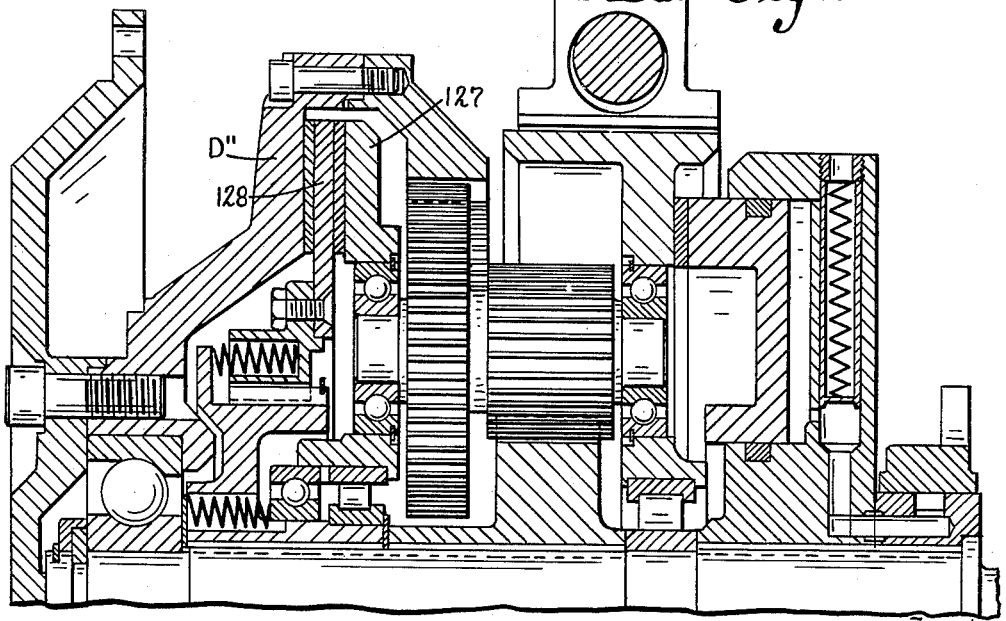
Figure 11:
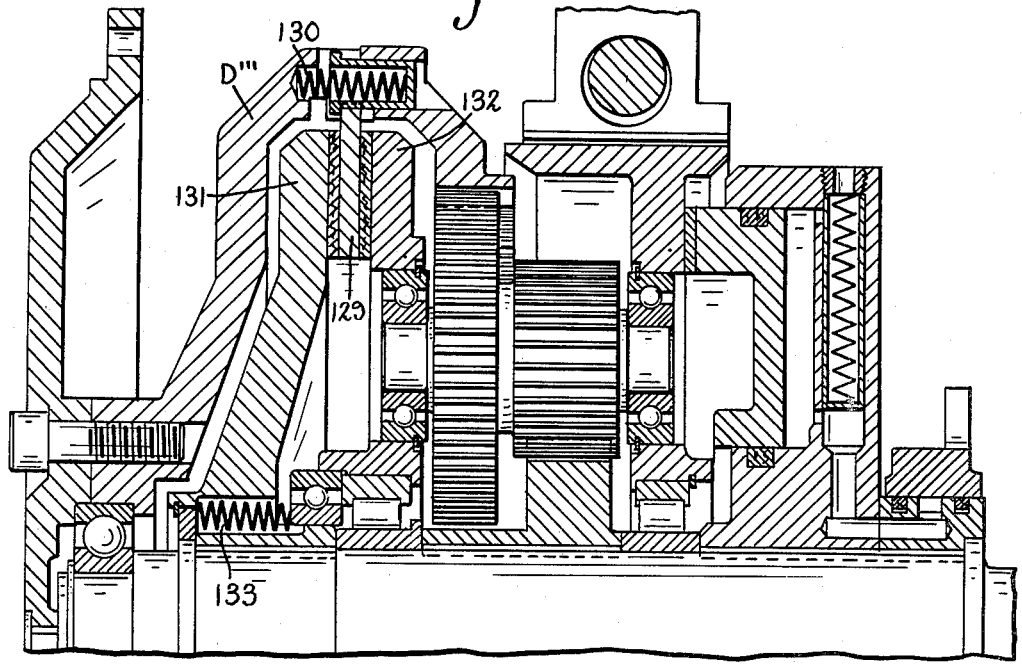
Figure 12:
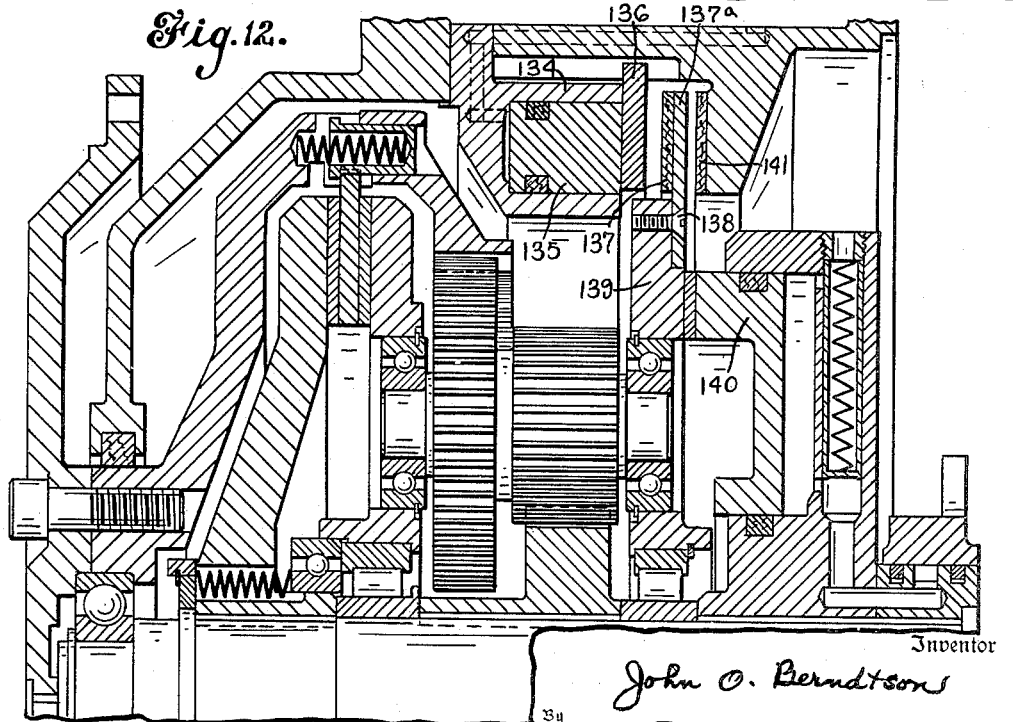

Fig. 4^A is a detail section showing on a larger scale the valve illustrated in Fig. 4 which controls the flow of pressure fluid to the pressure device by which the friction clutch is engaged;

Fig. 5 is a section on line 5—5 of Fig. 4;

Fig. 6 is an enlarged vertical longitudinal section of a portion of the gear showing the parts in position for reverse drive;

Fig. 6^A is a detail elevation of the brakeable drum member whose rotation is arrested for producing reverse drive, looking toward its forward face;

Fig. 6^B is a section on line 6^B—6^B of Fig. 6^A;

Fig. 6^C is an elevation of this member looking toward its rear face;

Fig. 7 is a section on line 7—7 of Fig. 4;

Fig. 8 is a section on line 8—8 of Fig. 6, showing the brake band in the tightened position;

Fig. 9 is a longitudinal vertical section generally similar to Fig. 6, showing a modified form;

Fig. 10 is a similar view showing a further modified form;

Fig. 11 is a similar view showing a further modification;

Fig. 12 is a longitudinal section showing a further modified form; and

Fig. 13 is a sectional view showing the mechanism of Fig. 12 in position for effecting reverse drive.

In the form of reverse gear shown in Figs. 1 to 8, inclusive, there is disclosed a reverse gear of the general type disclosed in the Nabstedt Patent 2,286,223, provided with a housing in which is mounted a main shaft or central shaft, the forward end of which has associated therewith a hub fixed to the shaft, to which hub there is connected a conical friction clutch member that is adapted to be frictionally engaged with the conical socket portion of a driving member, generally in the form of a cup that is enclosed within the forward end of the housing and is adapted to be rotated from the engine shaft. Rearwardly of the friction clutch in concentric relationship to the shaft is a rotary member rotatable about the shaft, which is adapted to have its rotary motion arrested by a brake band, said rotary member in this present form being movable axially under the action of a suitable pressure fluid such as air or oil, and carrying means for engaging the friction clutch when said brakeable member is shifted in a forward direction. The brakeable member referred to also carries parts of suitable gearing adapted to mesh with an internal gear carried by the cup-shaped driving member and with a gear fixed on the central shaft whereby, when the brakeable member or pinion cage has its motion arrested, reverse drive of the central shaft can be effected. In this case the brakeable member is shifted forwardly by means of a pressure-fluid piston located rearwardly thereof, and the brake band encircling the brakeable member can be tightened by a special fluid-pressure device provided for that purpose, the latter device and the clutch-engaging piston being under the control of a single control valve located, in this particular case, on the upper portion of the housing. The pressure upon the pressure fluid is derived by providing a fluid pump, which in this case is mounted on the rear end portion of the housing and is rotated from the engine or other prime mover by a drive shaft extending longitudinally through the central shaft or main shaft.

Also in the particular case shown the propeller or other power take-off is driven by a short shaft connected to the rear end portion of the main shaft by reduction gearing, as hereinafter described.

In this form of the device the reverse gear housing is shown at A, the central shaft or main shaft at B, the stub shaft carrying the propeller drive flange at C, the driving member or cup at D, the friction clutch associated with the member D, at E, the axially movable and rotary brakeable member or pinion cage at F, the fluid pressure device for engaging the friction clutch at G, and the fluid-pressure device for tightening the brake band at H. The control valve for controlling the distribution of the fluid-pressure medium is shown at I. The fluid-pressure pump is shown at J.

Referring now to the details, it will be noted that the cup-shaped driving member D is located within the housing near the front end of the latter and is faced in a rearward direction from a central or hub portion 20 of said member that is supported by a suitable anti-friction member on a reduced portion 21 near the front end of shaft B, the anti-friction bearing being held in place by a collar 22 screwing on the forward extremity of the shaft. The shaft has a longitudinal bore extending through it from end to end, and through this bore extends a rotary shaft 23 connected to the driving member and arranged to drive the rotor 24 of the pump J. Pump J, which is an oil pump, has a casing 25 which is mounted on the rear end wall of the housing, and the shaft 23 extends through holes in the housing parts and is suitably coupled to the pump rotor. At the forward extremity of the pump-operating shaft 23 the latter is rigidly fastened in a suitable manner to a flange 26 that is fastened as by a number of screws 27 to the hub portion of the driving cup D. The flange 26 is driven from the engine or other prime mover, for example by being connected in a suitable manner to the engine flywheel 28, and it will be obvious how the member D is driven by rotation of the prime mover.

Rearwardly of the anti-friction member on which the driving member D is mounted, the shaft B has keyed thereto a hub member 29, said hub member being provided with a sleeve 30 embracing the shaft, and with an outstanding web 31 and an axially extending rim 32. Connected to the rim 32 by splines is a friction-clutch member 33 forming part of the friction clutch E, said member 33 having a web, and integral with the web an outwardly and rearwardly sloping portion 36 having parallel cone surfaces to which friction material is applied, as shown in Fig. 6. The friction material applied to the outer surface is adapted to engage the conical inner surface 37 of the member D, and the inner friction surface of part 36 is adapted to engage a cone ring 38 acting as a further part of the clutch E, the arrangement being such that ring 38 by axial movement is adapted to be pressed against member 33, and member 33 pressed in turn against driving member D. A plurality of springs 39, arranged in suitable sockets in the member 33, normally hold this intermediate member 33 in the disengaged position shown in Fig. 6. The member 38 is in the form of a ring having integral therewith a web 40 that has a central aperture by means of which the member 38 is supported upon an anti-friction bearing, conventionally shown at 41, said bearing being interposed between a portion of the member 38 and a portion of the sleeve 30 of hub 29. The outer race of the bearing 41 is attached to the member 38, and the arrangement is such that the member 38 can have a certain amount of axial movement. The sleeve 30, previously mentioned, is spaced by means of a spacer sleeve 42 from a sun gear 43 which is fixed upon the shaft B and keyed thereto, said gear being immediately forward of the central portion 44 of a web 45 that is provided with an axially extending rim 46, the parts 45 and 46 being parts of the brakeable member F, previously mentioned, around which extends a tightenable brake band, as hereinafter described. The radially inner part or hub 44 of web 45 is supported from the shaft by an anti-friction bearing, conventionally shown at 47, the arrangement being such that the brakeable member can have a certain amount of axial movement while supported upon the anti-friction members of bearing 47. Immediately rearwardly of the member 45, 46 is arranged the fluid-pressure device G. This latter device comprises a piston-containing casing 48, and an axially movable annular piston 49.

The casing 48 is in the nature of a flange-like member concentric with the shaft and embracing the shaft by an inner part 50 which is of the profile shown in Fig. 6 and is keyed to the shaft forwardly of a collar 51 provided upon the shaft. This casing has forwardly projecting annular parts 52 and 53 (the latter part being at the periphery of the casing) between which the annular body of piston 49 is guided for movement in a forward and rearward direction. The piston is provided at the forward part with a radially and outwardly extending flange 54 provided on its forward surface with a facing material 55, which, when the piston is moved forwardly, engages the web of the brakeable member 45, 46 for the purpose of shifting the brakeable member. The flange 54 of the piston 49 may project radially outwardly beyond the periphery of the casing 48 and into proximity to the inner face of the rim 46, as shown in Fig. 6. Within the casing 48 and rearwardly of the piston is a fluid-control valve 56 which controls the admission of fluid (oil) into the annular chamber or pressure cylinder in the casing rearwardly of the piston. The structure and operation of the valve 56 will be taken up at a later point.

Rearwardly of the casing 48 a two-part annular member 57 embraces the shaft, said member having an inner part 58 and an outer part 59, the inner part being keyed to the shaft and being fastened to the casing 48 by means such as bolts 59a (Fig. 4). The outer part of member 57 is stationary so that the part 58 rotates inside of it, and suitable packing is placed between parts 58 and 59, as shown in Fig. 6, to prevent leakage. Part 59 is located in a rabbetted portion of part 58 and is held against rotation by suitable means, for example, a pin 60 on the housing projecting forwardly from a partition 61 within the housing and engaging a fork 62 projecting upwardly from the part 59, as shown in Figs. 4 and 5.

The partition 61 is located toward the rear end of the housing and is equipped with a main bearing, conventionally shown at 63, for the shaft B. This partition is also provided with a bearing 64 for the forward end of the stub shaft C. The stub shaft C has keyed to it a double gear 65 which meshes with a double pinion 66 keyed to the shaft B. The rear wall of the housing, which is indicated at 67, is provided with a bearing 68 for the adjacent end of shaft B, and with a bearing 69 in which the middle portion of shaft C is mounted. The pump-operating shaft 23 extends through the wall 67 and is surrounded by suitable packing 70 in this wall.

Reverting now to the brakeable member F, the member 45, 46 has been described above. This member is of the form shown in Figs. 6A, 6B and 6C, having the central shaft-embracing part 44 that has been previously referred to. The member is also provided at a number of points, preferably three points, with forwardly extending supports or brackets 72 which serve to secure in place the friction clutch member 38. This cone member 38 has portions of web 40 which abut against the supports 72, the parts 72 and 40 being secured together by means such as the bolts 74, the heads of which are accessible at the farward part of the clutch member. By this arrangement the webs of the clutch member and the brake member or drum, respectively, are rigidly interconnected so as to provide a clutch and braking member of composite structure, this member also mounting certain gears by which reverse drive of the shaft is accomplished.

The gears just mentioned are mounted upon stub shafts 75, of which three are provided in this case, each such stub shaft having rigidly fixed thereon a pinion 76 which meshes with the sun gear 43, previously mentioned, and a gear or large pinion 77. For meshing with all of the gears 77, an internal spur gear 78 is provided, this gear being suitably fixed to the rear open end of the driving cup D, as by bolts 79. The stub shafts 75 are mounted for rotation in the members 38 and 45, the member 38 being provided with apertures in which are placed anti-friction bearings 80 mounting the forward ends of the shafts 75, and the web 45 being provided with openings in which are received anti-friction bearings 81 for the rear ends of the shafts. It will be understood that the internal gear 78 and the sun gear 43 are held against longitudinal movement, and that the gear or pinion members 77 and 76, on the other hand, being mounted in an axially movable member, are adapted to have a certain amount of longitudinal movement. The necessary longitudinal movement of the axially movable gear members is permitted without disturbing the mesh of the gears. In this particular case the internal gear is wider than the gear 77, and pinion 76 has a somewhat wider face than the sun gear 43.

The member 45, 46 is braked by means of a brake device having a brake band embracing the rim 46 that provides the brake drum, said band having extremities one of which is approached toward the other for applying the brake. In the case shown, the band is indicated at 82 and has upwardly projecting end lugs 83, 84 through which extends a slidable rod 85 surrounded by a spring 86 that normally holds the brake in the released position. Pivoted on the lug 84 by a pivot member 87 is an operating lever 88 having connection at 89 with a slotted end portion 90 of rod 85. For applying the brake, the lever 88 is lifted from its remote or free end, and this is accomplished by the hydraulic device H, previously mentioned. This device H is mounted in the upper part of the housing laterally of the brake band, and it comprises a fixed cylinder 91 in the form of an upwardly facing cup in which is disposed a piston 92 having a downwardly extending piston rod 93. The piston rod 93 has an extension 94 beyond the upper face of the piston, which extension engages the lever 88 for applying the brake.

The controlling valve I, previously mentioned, has a casing 95, which in this instance is applied to the top portion of the housing, and within the casing 95 is a plug 96 adapted to be turned by an external handle 97. From the discharge side of the oil pump J a pipe 98 extends upwardly to the upper part of the housing, as shown in Fig. 3, this pipe being in communication with a conduit 99 that leads into the casing 95 of valve I. Connected with the suction side of the pump J is a downwardly leading pipe 100, shown in Fig. 3, which is in communication with an oil sump in the bottom of the housing. The brake-actuating cylinder 91 of device H is in communication with a supply pipe 101, shown in Fig. 5, which pipe leads to the valve casing 95 by way of a conduit 102 in the housing. A pipe 103 (Fig. 5) leads at one end to a conduit 104 in the upper part of the housing that is adapted to be placed in communication with the interior of valve casing 95, and at the opposite end pipe 103 is connected to a conduit or duct 105 in the part 59, previously described. The duct 105 communicates with an annular groove 106 in the part 58 of the fluid-casing member, and the groove 106 is in constant communication with a longitudinal duct 107 in the part 58. This duct 107 is in turn in communication with a duct 108 which leads radially outwardly in the casing member 48 and conducts the pressure fluid outwardly to the rim portion of the casing 48. In this rim portion the duct 108 communicates with a chamber 109 that is radially disposed with respect to the casing member 48 at one side of the duct 108 and is provided at its radially outer part with a lateral inlet part.

Figure 4A:
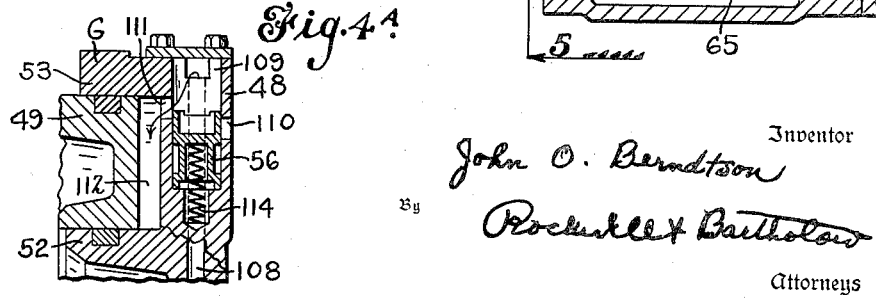

The shape of the chamber 109 will be apparent from Figs. 4A and 6, and it will be seen that this chamber is in the form of a cylindrical bore having a port 110 at one side which leads into the housing of the reverse gear and having at the opposite side a port 111. The last-named port establishes communication with the chamber or space 112 behind the piston 49 whereby fluid can be introduced into the pressure chamber for the actuation of the piston. The chamber 109 contains the previously mentioned valve 56. This is a hollow cylindrical valve pressed radially outward by a coil spring 114. The spring holds this valve normally in the position shown in Fig. 6, in which position an upper cup-shaped portion of the valve is held against the top of the casing 48 tending to prevent the entrance of fluid from the pressure source into chamber 109, exhaust port 110, however, being in communication with port 111 by way of an annular groove provided upon the valve body. When the valve I is in the position shown in Fig. 4 in full lines, which is the position for forward drive, the duct 107 is supplied with pressure fluid from the pump and the valve 56 is held in the inner position of Fig. 4A.

Pressure introduced into the chamber 112 moves the piston 49 to the position shown in Fig. 4. For hastening the return of the piston after pressure has been relieved, the piston can be under the influence of suitable spring means, such as shown in Fig. 4, which in this instance is interposed between the piston wall and the rear wall of the casing 48. In this present example, a number of such spring devices are used, each one comprising a helical spring mounted on a guide rod 115 mounted on the piston, the spring being enclosed within a cup-shaped member 116 fixed to the casing. The spring is placed under compression when the piston is moved to the position of Fig. 4, and tends to return the piston to the initial position when fluid pressure is relieved. There are also provided a number of springs such as the helical spring 117, shown in Fig. 4, which are interposed between the sun gear 43 and the brake drum member for the purpose of returning the brake drum member to the initial position when the fluid pressure acting on the piston is relieved.

When the handle 97 of valve I is moved from the forward drive position of Fig. 4 to the neutral position which is the upright position of the lever, pressure behind the piston 49 is relieved, and the valve 56 is moved by its spring to the position shown in Fig. 6. On the other hand, when the valve I is moved from the neutral position to the reverse position, i. e., the rearwardly slanted dotted-line position of Fig. 4, the valve I acts to establish communication between the pump J and the pressure device H. The valve I is a three-way valve having any approved construction, and as such valves in themselves are well known, it is unnecessary to go into the particulars of this valve structure.

For producing forward drive, the distributing valve I is placed in the position above described, thus causing forward movement of the piston 49. The friction face of this piston engages the web of the member 45, 46, and the unit comprising this member, the clutch member 38, and the stub shafts carrying the planetary pinions is shifted to the position shown in Fig. 4, where the intermediate member of the clutch is tightly confined between the clutch member 38 and the driving member D. This engagement of the clutch causes the shaft B to be driven from the forward end through the driving hub 29. In this position of the parts the driving member, clutch member 38, pinions 77 and 76, sun gear 43, and drum 45, 46 all rotate together as a unit, the brake band being in the released position. Pressure to maintain the friction clutch in engagement is supplied by the pressure fluid continually being held against the piston. Upon movement of the distributing valve to the neutral position, the gear cage is moved axially to the position shown in Fig. 6, which releases the friction clutch, the fluid pressure behind the piston being vented, and other parts being moved by springs, as previously described. When the distributing valve is moved from the neutral position to the reverse position, the drum 45, 46 is braked by tightening of the brake band, as previously described, and this holds stationary the member comprising the clutch element 38, the brake drum, and the pinions 77 and 76. The axes of the pinions being stationary, the reverse rotation of the shaft is produced in a very simple and effective manner, pinions 77 being rotated by internal gear 78 in the same direction as the rotation of the internal gear, pinions 76 being also rotated in this same direction, and sun gear 43 meshing with the pinions 76 being rotated in the opposite direction. Upon movement of the distributing valve back to the neutral position, pressure in the brake-band-tightening device H will be relieved and the fluid in said device will be vented. In the neutral position, pinions 77 being in engagement with the internal gear, there will be some tendency for the gear cage to rotate about the shaft, but this will be resisted by the action of the water upon the propeller.

It is noted that in Fig. 4, the inlet valve 56 for controlling the supply of fluid to the clutch-operating piston is shown in the position in which it is thrust radially inwardly by the pressure of incoming fluid. The spring acting on this valve tends to move it radially outwardly, and hence when the valve 56 is in the closed-off position shown in Fig. 6, allowing the fluid to vent from the pressure chamber, the spring assists the action of centrifugal force, which also tends to hold the valve in the Fig. 6 position.

In the form now being described a clutch member 38 and a brakeable member shown as a brake drum 45, 46, are directly interconnected to form a rigid frame or cage in which the pinions 77, 76 are carried. Member 38 is provided with a friction surface so that it acts as a member of the clutch E but modification might be made in this respect, for example, by having the forward part of the cage-like member act as a pusher only, the part engaging the friction member 36 or like member being a separate interposed part. However, it is advantageous to have the parts arranged as shown, so that the pinion-carrying cage has the additional function of being a friction-clutch member, for obviously this reduces the number of parts used in the mechanism; and also this arrangement serves to eliminate or reduce vibrational noises.

In the modified form shown in Fig. 9, the friction clutch is provided in part by the driving cup D' and in part by a forwardly sliding cone member 118 keyed to the hub member 119 on the main shaft. In this case the cone member 118 is adapted to be shifted forwardly to engage the driving cup by means of a plate 120. In this case the plate 120 is the forward frame member of the pinion cage, having at the peripheral part a flat friction surface to engage the flat rear friction surface of the member 118. In general this form of device is similar to that previously described, although the fluid supply duct 121 to the fluid-pressure chamber 122 contains an inlet port 123 in a radially inner location. This port 123 is open when the clutch is in the engaged position, as shown in Fig. 9, but is closed by a tubular valve 124 acted upon by an internal spring 125 when the pressure in the pressure chamber is relieved. When this takes place the valve is moved radially inwardly, and when this occurs the chamber can vent through a port 126 adjacent the outer end of the valve.

In the form shown in Fig. 10, a plate friction clutch is provided between the driving cup D" and the pinion cage, the forward end member of the pinion cage being constituted by a clutch plate 127. The spring-pressed member, which is keyed to and slidable on the hub at the forward end of the shaft, has a peripheral plate portion 128 adapted to be engaged between members D" and 127 in providing for forward drive.

In the form shown in Fig. 11, another arrangement of plate clutch is provided. Here the driving cup D''', which, as in previous forms, carries an internal gear, has mounted thereon in sliding spring-pressed splined relationship, at the peripheral portion of the cup, a clutch plate 129. Springs 130 normally hold this plate out of engagement with a plate clutch member 131 rigid with the shaft. Plate 132 of the pinion cage is adapted to clamp the plate 129 against the plate 131. A number of springs 133, associated with the forward end portion of the shaft, normally hold the pinion cage and its plate 132 in the disengaged position.

In the form shown in Figs. 12 and 13, the form of the friction clutch is similar to that shown in Fig. 11. In this instance, however, a modified arrangement is disclosed for holding the pinion cage against rotation. In this case the pinion cage is held against rotation by a rearwardly acting cylinder and piston device supplied with fluid from the distributing valve. The cylinder is shown at 134 and the piston at 135, the piston being an annular piston which has an axial rearward movement for locking the pinion cage against rotation. Fig. 12 shows the cylinder and piston in the inoperative position, and Fig. 13 shows them in the operative position. In the operative position the annular plate 136, which is movable forwardly and rearwardly and is engageable by the rear face of the piston, is pressed against a flat annular friction member 137 carried by a member 137ª suitably fixed as by screws 138 to a disklike member 139 that forms the rear end member of the pinion cage, said member 139 being engageable by the annular piston 140 used in engaging the friction clutch. The member 136 is splined to the casing as shown, so as to be prevented from rotary movement. When the braking piston 135 is in the operative position, the plate 136 is forced rearwardly so that the plate 137, 137ª is clamped between it and a stationary friction member 141 provided on the housing.

From the foregoing description it will be apparent that a relatively simple, compact and conveniently operable reverse gear is provided, adapted for manipulation by fluid pressure. By these improvements a reverse gear for marine use of maximum compactness and minimum length is provided. It will be apparent also that the parts used for producing reverse drive are of maximum simplicity, numerous parts heretofore used in devices of this general type being eliminated. Obviously the number of parts is reduced by having the pinion cage act additionally as a part of the friction clutch that produces forward drive. Moreover, the number of parts is markedly reduced by the gearing employed for producing reverse drive, including the actuating internal gear, the sun gear fixed to the shaft, and the interposed pinions, the internal gear being a part of or rigid with the driving member. The number of parts between the drive member and the shaft is reduced to a minimum because only one group of stub shafts is employed, each stub shaft carrying a large pinion and a small pinion. The pinions are rotated in the same direction as the internal gear, and hence for producing reverse drive it is only necessary to provide a fixed gear on the shaft, which meshes with certain pinions, these being, in the cases illustrated, the small pinions. Moreover, the structure is greatly improved by having the pinion cage axially movable for engaging the friction clutch. In the position for forward drive the gear cage is tightly locked between the power-driven member and the piston at the rear of the cage, with the planetary gears held from rotation, and there is no chattering of these gears or their appurtenances. The mechanism for shifting the pinion cage to the friction-clutch-engaging position is arranged at the rear of the pinion cage and is adapted to push the latter forwardly when pressure is applied. The rearwardly placed hydraulic shifting mechanism is very simple and reliable and easily accessible. The provisions for producing forward movement of the cage under the effects of fluid pressure are also very effective and easily controlled and advantageous in other respects.

It will be observed that the gearing employed for securing reverse drive of the shaft includes a sun gear fixed to the shaft, a driving internal gear carried by the engine-driven member and a cage that is axially movable and has revoluble therein pinion shafts having pinions meshed with the internal gear and other pinions meshed with the sun gear, the mesh referred to being maintained regardless of the position of the cage within certain limits. The forward member or end plate of the gear cage is located within the driving member which comprises the cup and its attached internal gear or ring gear, and the larger pinions are within the cup-shaped member. The pinion shafts are short and by the arrangement described the pinion cage is brought up close to the friction clutch, which enables a very short main shaft to be employed. The fluid device for shifting the pinion cage by pressing it in a forward direction also contributes to the compactness of the structure, as this device takes up little space in axial direction. In the arrangement shown in Fig. 6, for example, a part of the fluid device is enclosed within the brake drums at one side of the drum, and a part of the gearing is enclosed at the opposite side of the drum.

While several embodiments are shown in the drawings, the invention can take various other forms, and many modifications and changes may be made within the principles of the invention and the scope of the claims.

What I claim is:

1. In reversing mechanism, the combination of a shaft, a power-driven member adjacent said shaft, means including a hub fixed to said shaft adjacent said power-driven member and a friction member projecting outwardly from said hub and shiftable in an axial direction but angularly rigid with said hub so as to rotate therewith for drivingly connecting said power-driven member to said shaft, and means for imparting reverse rotation to said shaft including an axially movable gear set member which on its axial movement in one direction drivingly connects the power-driven member to said shaft, said gear set member carrying a friction member which engages said first friction member with said power-driven member.

2. In a reversing mechanism having a shaft and a driving member connectible by a friction clutch to the shaft, means for producing reverse rotation of the shaft including an internal gear mounted on the driving member and means cooperating with said internal gear including pinion shafts carrying pinions which engage said internal gear and carrying other pinions which engage a sun gear fixed to the shaft, said pinions being mounted for axial movement, and a fluid-pressure device having a piston for producing axial movement of the pinions, said pinions being carried by a cage movable in the direction of said driving member by direct thrust of said piston on the rear end of said cage, said cage when pushed toward said driving member acting to connect said member drivingly to the shaft for forward drive.

3. In a reversing gear, a shaft having a forward end, a driving member adjacent said end, a friction-clutch means for connecting said driving member to said shaft, an axially movable brakeable gear cage having gears co-acting with a gear on said shaft and with a gear driven from said driving member, which gear cage produces reverse rotation of said shaft when said cage is in a predetermined axial position and is braked, and which gear cage is adapted by forward movement to engage said friction clutch means, and a fluid-pressure device rearwardly of said cage engageable with the rear end of the latter to shift the cage forwardly.

4. In reversing mechanism, the combination of a driven shaft having a forward end and a rear end, a driving member adjacent the forward end of the shaft, a brakeable gear cage movable along the shaft in a forward and rearward direction and carrying a rotary pinion shaft equipped with a rearwardly disposed pinion engaging a sun gear fixed on the shaft and a forwardly disposed pinion engaging an internal gear fixed to said driving member, said gear cage having forward and rear end members each comprising a transverse wall, means including a friction clutch operable by the forward end member of the cage for frictionally connecting the driving member with the shaft, and means including a fluid-pressure piston engageable with the wall of the rear end member of the cage for shifting the cage axially and thereby engaging said friction clutch means.

5. In reversing mechanism, the combination of a driven shaft having a forward end and a rear end, a driving member adjacent the forward end of the shaft, a brakeable gear cage movable along the shaft in a forward and rearward direction and carrying a rotary pinion shaft equipped with a rearwardly disposed pinion engaging a sun gear fixed on the shaft and a forwardly disposed pinion engaging an internal gear fixed to said driving member, said gear cage having forward and rear end members each comprising a transverse wall, means including a friction clutch operable by the forward end member of the cage for frictionally connecting the driving member with the shaft, and means including a fluid-pressure piston engageable with the wall of the rear end member of the cage for shifting the cage axially and thereby engaging said friction clutch means, said piston being movable forwardly and rearwardly in an annular chamber or cylinder located rearwardly of the cage.

6. In reversing mechanism, the combination of a driven shaft having a forward end and a rear end, a driving member adjacent the forward end of the shaft, a hub fixed to the forward end portion of the shaft, friction clutch means for clutching the hub to the driving member, a longitudinally sliding and rotatable cage carrying reversing gears and embracing the shaft rearwardly of the hub adapted by forward movement relatively to the shaft to engage said friction clutch means so that the driving member and the shaft are locked together, means for arresting the rotation of the cage, and means for engaging said clutch means comprising a fluid-pressure-actuated cage-shifting piston engageable with the rear end of the cage.

7. In reversing mechanism, the combination of a shaft, a power-driven member adjacent said shaft, means including a hub fixed to said shaft adjacent said power-driven member and a friction member movable longitudinally of said hub and angularly rigid with respect thereto so as to rotate therewith for drivingly connecting said power-driven member to said shaft, a rotatable longitudinally movable gear cage which by forward movement toward the power-driven member imparts operating movement to said friction member, said gear cage carrying reverse gear members cooperating with respective gear members on the power-driven member and on the shaft, a casing member surrounding the shaft rearwardly of said cage and carrying a forwardly facing fluid chamber, a forwardly movable piston in said chamber adapted to exert forward thrust on the cage and engageable with the rear end of the cage, and fluid-pressure-actuated means for arresting rotation of the cage.

8. In reversing mechanism, the combination of a driven shaft having a forward end and a rear end, a driving member adjacent the forward end of the shaft, a rotatable cage slidable forwardly and rearwardly along the shaft equipped with a reversing pinion engaging an internal gear on the driving member and another reversing pinion engaging a sun gear on the shaft rearwardly of said internal gear, means including a friction clutch disposed forwardly of the cage and forwardly of said internal gear and operable by forward movement of the cage for clutching the driven shaft to the driving member, fluid-pressure means comprising a piston engageable with the cage for shifting the cage axially, and means for arresting the rotation of the cage.

9. In reversing mechanism, the combination of a shaft, a power-driven member concentric with said shaft having a peripheral wall, a hub fixed to said shaft within said wall, a friction member on said hub and axially slidable with respect thereto, a spring between said friction member and said hub urging said friction member in a direction opposite said power-driven member, said hub being connected to said friction member for rotation with the latter, said friction member being frictionally engageable with said power-driven member for driving said shaft from said power-driven member, and means operable upon disengagement of said friction member and including an internal gear carried by said peripheral wall for imparting reverse rotation to said shaft, said last-named means also including a gear cage axially slidable with respect to said internal gear, said gear cage being movable toward said power-driven member to engage said friction member with said power-driven member.

10. In a mechanism such as described, the combination of a shaft, a power-driven member concentric with said shaft having a peripheral wall, a hub fixed to said shaft within said wall, a friction member projecting outwardly from the periphery of said hub and angularly rigid with said hub so as to rotate therewith but shiftable in an axial direction, a spring between said friction member and said hub urging said friction member in a direction opposite the power-driven member, said friction member being frictionally engageable with said power-driven member for driving said shaft from said power-driven member, a second friction member located rearwardly of the first friction member and movable lengthwise of said shaft to engage said first friction member and shift the latter into engagement with said power-driven member, and fluid actuated means including a piston engageable with said second friction member to shift said first and second friction members forwardly and engage said first friction member with said power-driven member to drivingly connect said shaft from said power-driven member.

11. In a mechanism such as described, the combination of a shaft, a power-driven member concentric with said shaft having a conical portion, a hub fixed to said shaft within said conical portion, a conical friction member angularly rigid with said hub so as to rotate therewith but shiftable in an axial direction, a spring between said friction member and said hub urging said friction member in a direction opposite the power-driven member, said friction member being frictionally engageable with said portion of the power member for driving said shaft from said power-driven member, a second friction member located rearwardly of the first friction member and movable lengthwise of said shaft having a forward conical portion to engage said first friction member and shift the latter into engagement with said power-driven member, said second friction member having a rear transverse wall, and fluid-actuated means including a piston engageable with said transverse wall of the second friction member to shift said first and second friction members forwardly and engage said first friction member with said power-driven member to drivingly connect said shaft from said power-driven member.

12. In a mechanism such as described, the combination of a housing, a driven shaft rotatably mounted in said housing, reduction gear means in the housing associated with the rear end of the shaft, a rotary driving member in the housing adjacent the forward end of the shaft, a hub fixed to the forward end portion of the shaft, friction clutch means for drivingly connecting said hub and said rotary driving member and including a rotatable gear cage carrying reversing gears and embracing the shaft, said cage being slidable forwardly and rearwardly with respect to said shaft and being adapted by forward movement relatively to the shaft to drivingly connect the latter to the rotary driving member, said cage having forward and rear transverse walls, a casing member surrounding the shaft within the housing and located forwardly of said reduction gear means and provided with a forwardly facing fluid chamber of annular formation, an annular piston in said chamber engageable with the rear wall of said cage for moving said cage in a forward direction, said casing member being provided with a dump valve associated with said chamber to which dump valve fluid is supplied from a distributing ring surrounding the shaft forwardly of said reduction gear means, and fluid-pressure-actuated means including an element in embracing relationship to the cage and engageable with the cage to arrest rotation of the latter.

References Cited in the file of this patent

UNITED STATES PATENTS

| | | |
|---|---|---|
| 1,029,610 | Harrington | June 18, 1912 |
| 1,260,599 | Tuttle | Mar. 26, 1918 |
| 1,794,044 | Tuttle | Feb. 24, 1931 |
| 1,918,775 | Nabstedt | July 18, 1933 |
| 2,141,209 | Emrich | Dec. 27, 1938 |
| 2,150,867 | Voigt | Mar. 14, 1939 |
| 2,193,317 | Flogaus | Mar. 12, 1940 |
| 2,228,617 | Ware | Jan. 14, 1941 |
| 2,288,206 | Pierpont | June 30, 1942 |
| 2,463,265 | Graves | Mar. 1, 1949 |
| 2,488,756 | Baker | Nov. 22, 1949 |
| 2,502,798 | Nabstedt | Apr. 4, 1950 |
| 2,502,799 | Nabstedt | Apr. 4, 1950 |

FOREIGN PATENTS

| | | |
|---|---|---|
| 19,144 | Great Britain | Aug. 27, 1907 |
| 259,548 | Switzerland | Jan. 31, 1949 |
| 649,436 | Germany | Aug. 24, 1937 |